June 24, 1947.  J. A. CLEVELAND  2,422,657
HYDRAULIC SEPARATION OF STONES FROM PEAS
Filed Oct. 18, 1943  2 Sheets-Sheet 1
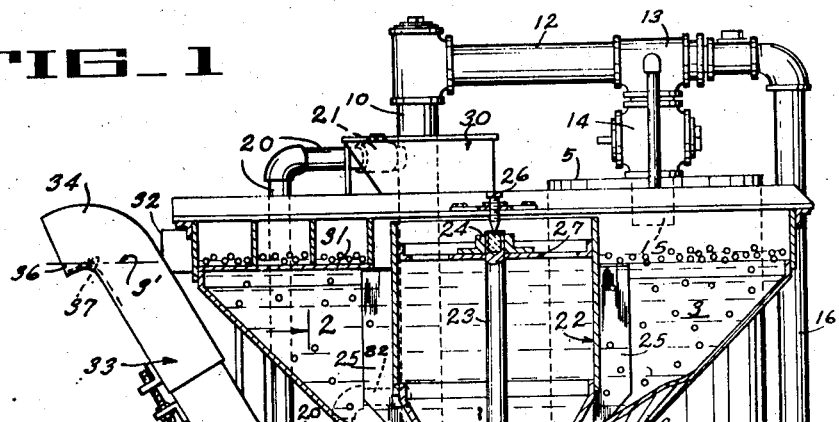
FIG_1
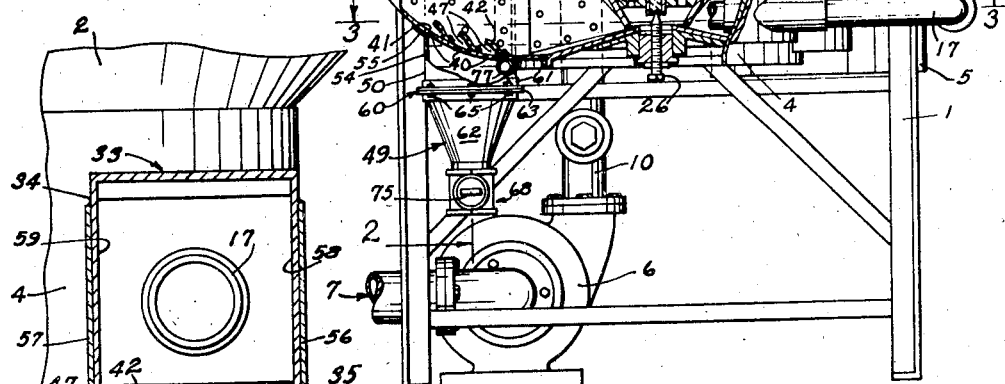
FIG_2
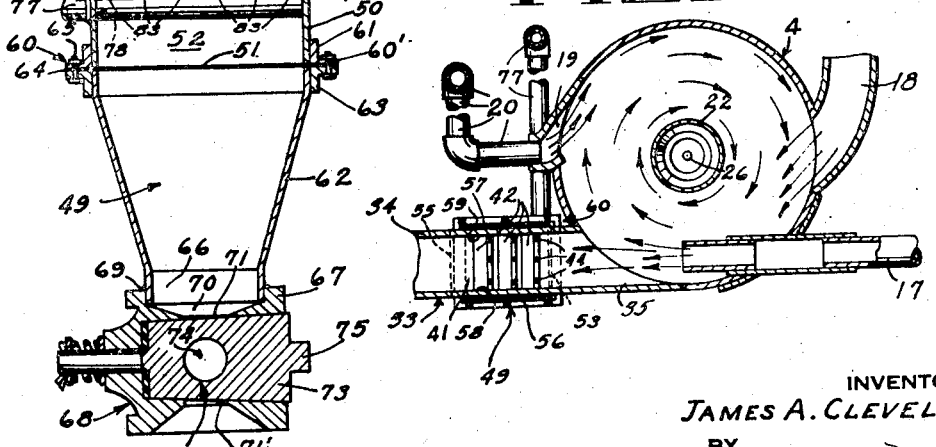
FIG_3
INVENTOR
JAMES A. CLEVELAND
BY
Philip A. Minnis
ATTORNEY June 24, 1947. J. A. CLEVELAND 2,422,657
HYDRAULIC SEPARATION OF STONES FROM PEAS
Filed Oct. 18, 1943 2 Sheets-Sheet 2
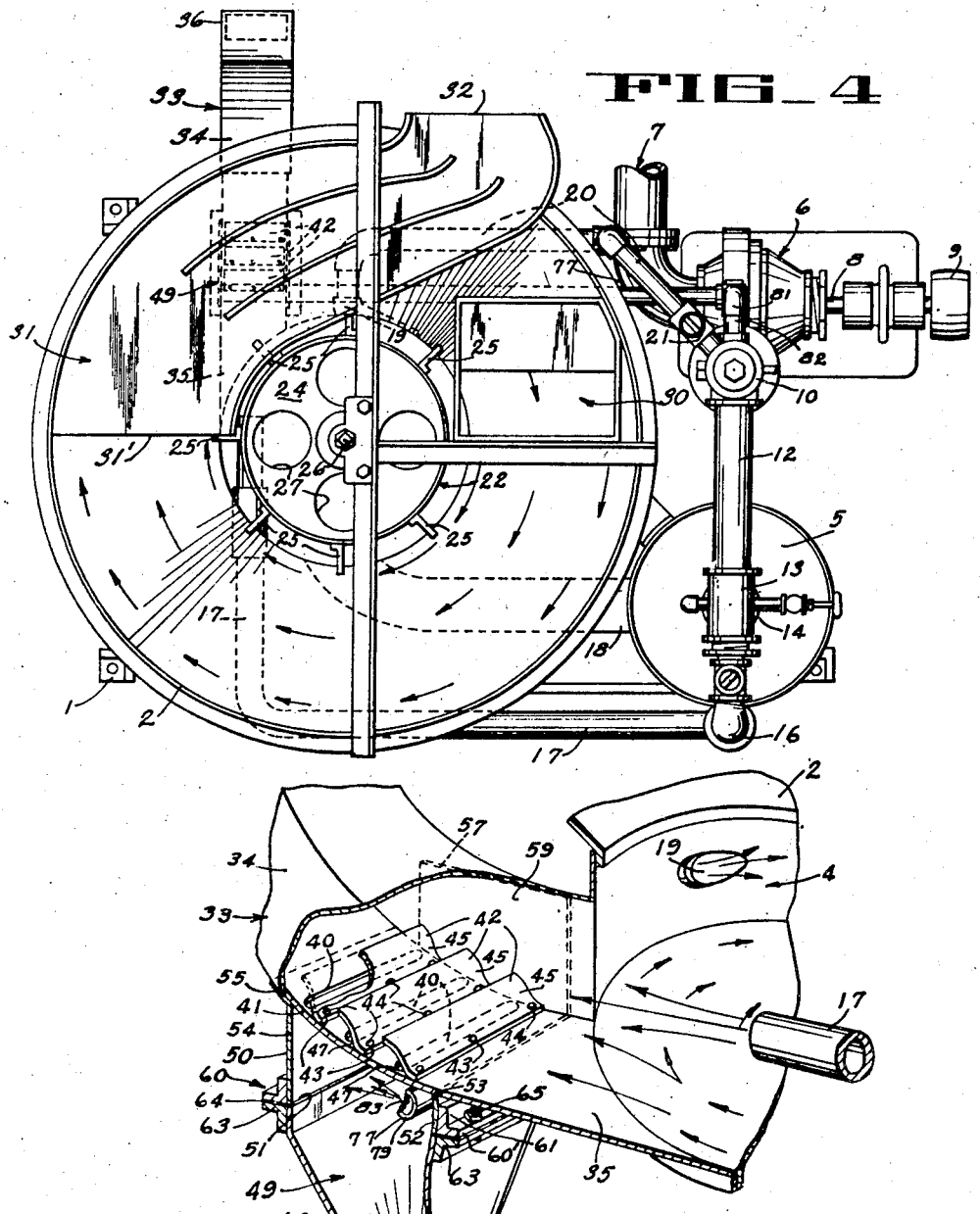
INVENTOR
JAMES A. CLEVELAND
BY
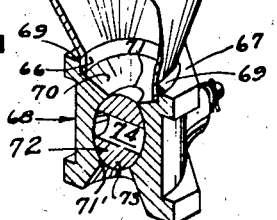
ATTORNEY Patented June 24, 1947

2,422,657

UNITED STATES PATENT OFFICE 2,422,657

HYDRAULIC SEPARATION OF STONES FROM PEAS

James A. Cleveland, Hoopeston, Ill., assignor to Food Machinery Corporation, San Jose, Calif., a corporation of Delaware Application October 18, 1943, Serial No. 506,696

3 Claims. (Cl. 209—458)

This invention relates to gravity separation apparatus and one of its principal objects is to provide a device of this character which is especially adapted for separating stones from lighter weight materials entrained in a flowing stream of liquid.

An important application of my invention is in conjunction with so-called "quality" graders such as commonly employed in the canning industry for grading or washing granular material such as peas, beans and similar products by means of a pool of water or brine in which the desired separation is effected between that portion of the product which sinks and that which floats.

In practice it has been found that small stones or pebbles intermixed with the product frequently come through the preliminary preparation line to the grader regardless of the care and diligence employed to avoid it, and these stones gravitate to the bottom of the grader where they accumulate in the discharge conduit and eventually clog it so as to interfere with the operation of the machine. This necessitates shutting down the machine and draining it to get at the obstructing accumulation of stones and clear them out.

My invention is especially well adapted for eliminating this difficulty and it is accordingly another important object of the invention to provide a grader of the type referred to with a stone separator which will effectively separate small stones and pebbles from the material being washed or graded and trap them at a point where they will not interfere with the operation of the machine and may be removed without the necessity of shutting the machine down.

Other objects and advantages will become more apparent from the following description of an illustrative embodiment of the invention taken in connection with the accompanying drawings in which:

Fig. 1 is a side elevation of a pea grader embodying my invention, certain parts being broken away to facilitate illustration;

Fig. 2 is a vertical sectional detail of the stone trap as seen along line 2—2 in Fig. 1;

Fig. 3 is a horizontal sectional view of the grader as seen along line 3—3 in Fig. 1;

Fig. 4 is a plan view of the pea grader shown in Fig. 1;

Fig. 5 is a fragmentary perspective view of the conveyer conduit and trap, partly broken away to more clearly illustrate the interior thereof.

It will be understood that apparatus embodying my invention may be utilized in conjunction with various forms of washing or grading apparatus of the general type referred to above. For purposes of this disclosure, however, I have chosen to illustrate it as employed in a grader of the construction disclosed in Patent No. 2,355,735 to Charles E. Kerr, dated August 15, 1944. Full details of this grader may be obtained by reference to said patent and I shall therefore describe it herein only insofar as necessary to a ready understanding of the present invention.

Generally described, this grader comprises a framework 1 which supports a circular settling or separating tank 2 filled with a body of brine solution 3 up to a level indicated by the dotted line 3' the brine being of the proper density to cause the lighter and tenderer peas or beans to float and permit those which are more mature, and therefore heavier, to sink. The lower portion of the tank 2 is formed to provide a settling chamber 4 into which the sinkers gravitate for removal in a manner presently to be described, and suitable means, also to be described hereinafter, is proivded for skimming the floaters from the surface of the brine.

Suitably supported on the frame 1 adjacent the separating tank 2 is a reservoir 5 for the brine solution 3. The reservoir 5 receives solution 3 from the discharge side of a pump 6 which is supplied from a source (not shown) through a supply pipe 7. The pump 6 includes a drive shaft 8 which may be connected to any suitable prime mover either directly or through the pulley 9 shown arranged on the shaft 8.

The pump 6 discharges the brine vertically through a main pipe 10 which is connected at its top to a horizontally disposed pipe 12 extending across the open top of the reservoir 5. A T fitting 13 on the pipe 12 above the reservoir 5 has a vertical branch which connects with a valve 14, the outlet 15 of which discharges into the reservoir 5. The other outlet of the T fitting 13 is connected to a vertically disposed pipe 16 which is in turn connected to a lateral pipe section 17 and the latter is connected to the settling chamber 4 for injecting solution thereinto. A square conduit 18 has one end thereof connected to the lower portion of the reservoir 5 and its opposite end connected to the settling chamber 4 to transfer brine into the settling tank and to produce a swirling action as the arrows in Figs. 3 and 4 indicate. A second inlet 19 (Fig. 3) is connected to the settling chamber 4 for injecting brine under pressure tangentially into the settling chamber 4. This inlet 19 is connected directly to the main pipe 10 by way of a conduit 20 (Figs. 1 and 3) which has a valve 21 for controlling the flow of brine from the main pipe 10 and for varying the velocity of the whirling solution in the tank 2.

An open ended drum 22 secured to a shaft 23 by means of circular hubs 24 is centrally mounted within the tank 2. The drum is provided with impelling vanes 25 and journalled for rotation under the influence of the whirling solution by means of pivot pins 26 engaging the ends of said shaft. This drum serves to confine the material undergoing the grading or washing treatment to the annular area between the outer surface of the drum and the inner surface of the tank and thereby keep the material out of the vortex formed in the center of the whirling solution where excessive turbulence would interfere with proper gravity separation. Openings 27 in the hubs 24 permit the solution to enter the drum.

Material to be graded, such as peas or beans, is fed into a hopper 30 suitably supported above the tank 2 to deposit the material onto the whirling surface of the solution 3 surrounding the drum 22. A skimmer pan 31 is suitably supported with its front edge 31' just beneath the surface of the solution to pick up floating material from the surface of the solution. The material picked up by the skimmer pan 31 is gradually forced along the same toward a discharge end 32 where it is discharged into any suitable receptacle (not shown).

The material which sinks in the solution settles downwardly into the settling chamber 4 and is carried off through a hydraulic conveyer generally indicated at 33 which comprises an inclined square discharge conduit 34 having its lower end 35 tangentially connected to the settling tank 4 so that the sunken material will, by centrifugal force, enter the conduit 34 for discharge therealong. The conduit 34 has an upper end terminating in a spout 36 the spill off point 37 of which lies just beneath the plane of the surface 3' of the solution 3 in the tank 2 so that the solution rises upwardly through the conduit 34 and spills off at the point 37.

It will be noted in Figs. 3 and 5 that the lateral pipe section 17 extends into the settling chamber 4 to inject brine into the latter toward its lower end 35 of the discharge conduit 34 and this serves to boost the brine solution together with the sunken material entrained therein upwardly along the inclined conduit so as to discharge at the spout 36 into any suitable receptacle (not shown) different from that into which the skimmer pan 31 discharges.

As mentioned above, it has been found in practice that small pebbles or stones are frequently introduced into the grader along with the peas or beans and they will, of course, sink in the solution 3 along with the heavier peas or beans and gravitate into the settling tank 4. These stones will carry along with the peas as long as the stream is going in a horizontal direction but when the stream ascends the conduit 34 they will only rise a short distance and then fall back toward the lower levels of the stream. Hence, while the velocity of the brine from the lateral pipe section 17 together with the whirling action of the brine in the settling tank 4 is sufficient to discharge the peas or beans through the inclined conduit 34, it is not sufficient to boost stones or pebbles all the way up to the spout 36 and as a result all of the stones and pebbles gravitate down to the lower end 35 of the conduit 34 and gradually accumulate there until the lower end 35 of the inclined conduit 34 is clogged and eventually obstructed.

By the use of my invention, however, I am enabled to separate such pebbles or stones from the peas or beans and to entrap them at a point remote from the normal flow of material through the conduit 34. To accomplish this result I provide one or more drop out openings 40 in the inclined bottom 41 of the conduit 34 adjacent the lower end 35 thereof, three such openings being provided in the illustrated embodiment, although this number may be varied as desired. I prefer to form these openings in the form of elongated slots as shown, but the shape may also be varied if desired. The purpose of these openings is to permit stones carried into the conduit 34 to gravitate downwardly therethrough and thereby be discharged from the conduit.

I prefer to provide a baffle or riffle 42 on the bottom of the conduit 34 immediately adjacent the upstream side of each drop out opening 40, these riffles being arranged transversely of the conduit. In the construction shown each of these riffles has a lower edge 43 suitably secured to the bottom wall of the conduit by rivets 44 or the like, and a central portion 45 inclined relative to the conduit bottom. The upper free edges of the riffles are curved slightly into substantial parallelism with respect to the bottom wall 41 and overlie the openings 40. It will be observed that each of the riffles is inclined upwardly in the direction of flow of the liquid and is spaced from the adjacent riffle to provide, in conjunction with the conduit bottom, a number of pockets or valleys 47 commensurate with the number of riffles, so as to collect stones or pebbles as they gravitate down the conduit 34 and direct them into the openings 40. The riffles also serve to deflect the lighter peas or beans upwardly into the stream flowing through the conduit so as to keep them well away from the openings, while the heavier stones merely glance off the riffles and are trapped as they gravitate into one or another of the respective valleys between the riffles.

Beneath and adjacent the lower end 35 of the conduit 34 there is a receptacle or a trap 49 which communicates with the conduit 34 through the openings 40 to receive the gravitating stones or pebbles from the latter and collect them at a point remote from the normal stream of solution 3. This strap 49 is formed by providing an adapter 50 which is rectangular in cross section and terminates in a horizontal open bottom 51. The adapter 50 comprises a front wall 52 having its upper edge 53 secured to the bottom wall 41 of the conduit 34 as by soldering or welding; a rear wall 54 having its upper edge bent slightly to provide an attaching flange 55 disposed at the same angle as the inclined bottom wall of the conduit 34 and secured thereto as by soldering or welding; and a pair of integral side walls 56 and 57 extending upwardly to embrace therebetween the side walls 58 and 59 of the lower end 35 of the conduit 34, each of these side walls 56 and 57 being likewise secured to their respective side walls 58 and 59 of the conduit 34 as by solder applied along their edges or by welding in a manner well known in the art. In this manner the adapter is secured in liquid tight relation to the bottom of the conduit 34.

Around the open bottom 51 of the adapter 50 there is provided a flange 60, in the present instance formed by attaching an angle iron 61 on each of the walls 52, 54, 56 and 57 with its lateral flange 60' extending therefrom in the plane of the bottom edge of the wall. The lower part of the trap 49 is in the form of an inverted frusto-conical chamber or throat 62 having a flange 63 similar to the flange 60, at its upper end and adapted to align with the flange 60 of the adapter 50 for securing the throat 62 thereto. A suitable seal or gasket 64 is positioned between the flanges 60 and 63 which are drawn tightly against each other by screws or bolts 65 so as to form a liquid tight seal.

The lower end of the throat 62 has a depending annular flange 66 which fits down into the upper end 67 of a discharge valve fitting 68 and is suitably secured in liquid tight relation thereto as by welding 69. This valve fitting 68 has a conical or dished surface 70 formed within the area surrounded by the annular flange 66 to direct the stones gravitating through the trap 49 toward an opening 71 formed through the fitting 68 along its vertical axis to facilitate the discharge of such stones through a discharge opening 71' formed in the lower end of the fitting. The vertical opening 71 is normally closed by a closure 72 in the form of a cylindrical plug valve 73 arranged transversely of the vertical opening 71 and rotatable in the fitting 68 to optionally align an opening or port 74 formed across the plug valve 73 with the opening 71 by hand operation through manipulation of a handle 75.

When the discharge valve 68 is closed, as shown in Figs. 2 and 5, the receptacle 49 is completely filled with brine solution 3 which normally flows through the grader and the pebbles and stones which gravitate through the openings 40 will collect in the chamber 62 at a point remote from the inclined conduit 34.

I have also discovered that by injecting a limited amount of solution into the trap 49 to create an influx of solution from the chamber 62 into the inclined conduit 34, there is an added assurance against certain of the heavier peas gravitating into the trap. To this end I have provided an auxiliary liquid introducing means in the chamber 62 by extending a pipe 77 across the chamber just below the bottom wall of the conduit 34 and preferably adjacent the front wall 52 of the adapter 50. The pipe 77 extends through an opening 78 formed in the side wall 59 of the adapter while the open end 79 of the pipe abuts and is closed by the side wall 58, the pipe 77 itself being secured to the adapter 50 by a weld seam 80 around the opening 78 in the wall 59. This pipe 77, as seen in Figs. 1 and 3, extends laterally and then upwardly for connection with a control valve 81 which in turn is connected to a stud pipe 82 extending from the main pipe 10.

The auxiliary injector pipe 77 has a plurality of jets or ports 83 formed in that section of the pipe 77 which is confined within the chamber 62. Each of these apertures 83 is so disposed as to direct a stream of solution upwardly in the general direction of the drop out openings 40. The resulting upflow of solution from the chamber 62 through the openings 40 into the conduit 34 may be controlled in velocity by manipulation of the valve 81 so that relatively light weight materials such as peas or beans are prevented from gravitating into the chamber through said openings without interfering with the downward gravitation of heavier materials such as stones.

Heretofore it has been necessary to shut down the grader when an excessive quantity of pebbles or stones collected in the lower region of the discharge conduit 34 and to drain off the entire body of solution 3 in order to get at and remove the heap of stones so accumulated. By utilizing my invention this is avoided and considerable time as well as solution is saved by merely opening the discharge valve 68 and evacuating the trap 49 while the grader remains in operation. This merely requires that the attendant manipulate the handle 75 of the discharge valve 68 to align the port 74 with the vertical opening 71 whereupon the stones and pebbles accumulated within the chamber 62 will be flushed out along with the discharge of the solution contained within the chamber 62.

By reason of the funnel shape of the chamber portion 62 of the trap 49 the pebbles and stones will, of course, collect on the conical surface 70 in readiness for discharge the moment the port 74 aligns with the vertical opening 71. In this manner there is only a slight loss of solution in discharging the stones, which loss is considerably less in comparison to the loss heretofore entailed where it has been necessary to shut down the grader and drain it incident to clearing out the stones.

From the foregoing description it is apparent that I have provided a novel means for separating stone particles from granular material such as peas and beans which have a specific gravity less than that of stones and that I have also provided for trapping such stone particles whereby they may be discharged during the normal operation of the grader.

While the particular structure herein described is well adapted for carrying out the objects of the present invention, it will be understood that various modifications, changes and substitutions may be made without departing from the spirit thereof and I deem myself entitled to all such modifications, changes and substitutions as may come within the scope of the following claims.

What I claim as new and desire to protect by Letters Patent is:

1. A gravity separation apparatus comprising an inclined enclosed conduit through which liquid may be passed to hydraulically convey material entrained in the liquid from a lower to a higher level, said conduit having a plurality of upwardly and forwardly projecting riffles each extending substantially across its entire bottom, said riffles being so disposed relative to each other as to form an open mouthed liquid quiescing pocket therebetween into which heavier weight material will settle, said conduit having an opening extending entirely across its bottom at the base of said pocket for discharging the heavier weight material gravitating into said pocket.

2. A gravity separation apparatus comprising an inclined enclosed conduit through which liquid may flow to hydraulically convey material entrained in the stream of liquid from a lower to a higher level, said conduit having a plurality of spaced drop-out openings each extending entirely across its bottom and adapted to pass stones desired to be separated from lighter weight material carried along by the liquid, and a riffle adjacent the entire upstream side of each of said openings, said riffles being so disposed relative to each other as to form open mouthed liquid quiescing pockets therebetween into which the stones will settle and being curved upwardly and forwardly to project over said openings for deflecting the lighter weight material upwardly into the stream of liquid and for guiding the settling stones into said pockets and openings.

3. A gravity separation apparatus comprising an inclined enclosed conduit through which liquid may flow to hydraulically convey material entrained in the liquid from a lower to a higher level, said conduit having spaced drop-out openings each extending entirely across its bottom and adapted to pass stones desired to be separated from lighter weight material carried along by the liquid, and a riffle within and on the bottom of said conduit adjacent the upstream side of each of said openings, said riffles being curved upwardly and forwardly to project over the adjacent openings and being so spaced relative to each other as to form liquid quiescing open mouthed pockets each extending entirely across said conduit for creating an undulating current in the liquid adjacent the bottom of the conduit to thereby deflect the lighter weight material into the upper strata of the liquid flowing through said conduit and the sinking stones into one or another of said liquid quiescing pockets for gravitation down the bottom of the conduit and through the openings therein.

JAMES A. CLEVELAND.

REFERENCES CITED

The following references are of record in the file of this patent:

UNITED STATES PATENTS

| Number | Name | Date |
| --- | --- | --- |
| 2,240,442 | Paul | Apr. 29, 1941 |
| 2,320,335 | Bauer | June 1, 1943 |
| 2,262,465 | Olney | Nov. 11, 1941 |
| 407,531 | Jenkins | July 23, 1889 |
| 368,033 | Wall | Aug. 9, 1887 |
| 1,037,809 | Van Eyck | Sept. 3, 1912 |
| 2,106,027 | Guest | Jan. 18, 1938 |